(12) United States Patent
Oh et al.

(10) Patent No.: US 12,147,038 B2
(45) Date of Patent: Nov. 19, 2024

(54) OPTICAL SYSTEMS WITH INTERLEAVED LIGHT REDIRECTORS

(71) Applicant: Apple Inc., Cupertino, CA (US)

(72) Inventors: Se Baek Oh, Millbrae, CA (US); Bradley C. Steele, San Diego, CA (US); Byron R. Cocilovo, San Jose, CA (US); Francesco Aieta, San Francisco, CA (US); Graham B. Myhre, San Jose, CA (US)

(73) Assignee: Apple Inc., Cupertino, CA (US)

( * ) Notice: Subject to any disclaimer, the term of this patent is extended or adjusted under 35 U.S.C. 154(b) by 376 days.

(21) Appl. No.: 16/539,818

(22) Filed: Aug. 13, 2019

(65) Prior Publication Data

US 2020/0096771 A1    Mar. 26, 2020

Related U.S. Application Data (60) Provisional application No. 62/735,560, filed on Sep. 24, 2018.

(51) Int. Cl.
G02B 27/01 (2006.01)
G02B 5/08 (2006.01)
(Continued)

(52) U.S. Cl.
CPC ........... G02B 27/0172 (2013.01); G02B 5/08 (2013.01); G02B 5/1814 (2013.01); G02B 5/32 (2013.01);
(Continued)

(58) Field of Classification Search
CPC ............ G02B 27/0172; G02B 27/0944; G02B 5/1814; G02B 5/08; G02B 5/32;
(Continued)

(56) References Cited

U.S. PATENT DOCUMENTS

| 7,751,662 B2 | 7/2010 | Kleemann |
| 8,160,411 B2 | 4/2012 | Levola et al. |
| (Continued) | | |

FOREIGN PATENT DOCUMENTS

| CN | 102445755 A | 5/2012 |
| CN | 104040410 A | 9/2014 |
| (Continued) | | |

OTHER PUBLICATIONS

U.S. Appl. No. 16/089,006, filed Sep. 27, 2018.

*Primary Examiner* — Balram T Parbadia
*Assistant Examiner* — Gabriel A Sanz
(74) *Attorney, Agent, or Firm* — Treyz Law Group, P.C.; Michael H. Lyons (57) ABSTRACT

An electronic device may include a display that produce images. The display may generate light for an optical system that redirects the light towards an eye box. The optical system may include a waveguide that propagates the light in a first direction towards the output coupler. The output coupler may couple the light out of the waveguide towards the eye box while inverting a parity of the light about the first direction. The coupler may include a first element such as a set of partial mirrors or diffractive gratings that redirects a first portion of the light in a second direction. The coupler may include a second element that redirects a second portion of the light in a third direction opposite the second direction. The first element may redirect the second portion and the second element may redirect the first portion towards the eye box.

17 Claims, 8 Drawing Sheets

(51) Int. Cl.
*G02B 5/18* (2006.01)
*G02B 5/32* (2006.01)
*G02B 27/09* (2006.01)

(52) U.S. Cl.
CPC .. *G02B 27/0944* (2013.01); *G02B 2027/0178* (2013.01); *G02B 2027/0187* (2013.01)

(58) Field of Classification Search
CPC .... G02B 2027/0178; G02B 2027/0187; G02B 2027/0174; G02B 27/4272; G02B 27/1086; G02B 27/0081; G02B 27/0103; G02B 27/42
See application file for complete search history.

(56) References Cited

U.S. PATENT DOCUMENTS

| | | | |
|---|---|---|---|
| 8,773,599 B2 | 7/2014 | Saeedi et al. | |
| 8,830,588 B1* | 9/2014 | Brown | G02B 27/0081 |
| | | | 359/630 |
| 8,934,171 B2 | 1/2015 | Desserouer | |
| 9,164,290 B2 | 10/2015 | Robbins et al. | |
| 9,915,825 B2 | 3/2018 | Robbins et al. | |
| 10,067,347 B2 | 9/2018 | Vallius et al. | |
| 10,267,970 B2 | 4/2019 | Jones, Jr. et al. | |
| 10,451,799 B2 | 10/2019 | Klug et al. | |
| 2007/0188837 A1 | 8/2007 | Shimizu et al. | |
| 2010/0271587 A1* | 10/2010 | Pavlopoulos | G02B 27/0172 |
| | | | 351/158 |
| 2016/0085300 A1* | 3/2016 | Robbins | G06F 3/013 |
| | | | 345/633 |
| 2016/0231569 A1* | 8/2016 | Levola | G02F 1/125 |
| 2016/0291328 A1* | 10/2016 | Popovich | G02B 6/0035 |
| 2018/0143509 A1* | 5/2018 | Oh | G02B 6/0076 |
| 2018/0210205 A1* | 7/2018 | Grey | G02B 27/0081 |
| 2018/0252869 A1* | 9/2018 | Ayres | G02B 27/0172 |
| 2018/0292647 A1 | 10/2018 | Fattal | |
| 2019/0086674 A1* | 3/2019 | Sinay | G02B 27/283 |
| 2019/0187474 A1* | 6/2019 | Bhargava | G02B 27/0172 |
| 2019/0339449 A1* | 11/2019 | Shipton | G02B 6/122 |
| 2020/0026074 A1* | 1/2020 | Waldern | G02B 27/0172 |
| 2020/0278554 A1* | 9/2020 | Schultz | G02B 6/0031 |
| 2021/0072534 A1 | 3/2021 | Olkkonen et al. | |

FOREIGN PATENT DOCUMENTS

| | | |
|---|---|---|
| CN | 106575034 A | 4/2017 |
| CN | 107250880 A | 10/2017 |
| CN | 107632406 A | 1/2018 |
| CN | 108139589 A | 6/2018 |
| CN | 108139593 A | 6/2018 |
| CN | 108873350 A | 11/2018 |
| WO | 2017120320 A1 | 7/2017 |
| WO | 2017120346 A1 | 7/2017 |
| WO | 2017222808 A1 | 12/2017 |
| WO | 2018034131 A1 | 2/2018 |
| WO | 2018091862 A1 | 5/2018 |
| WO | 2018125574 A1 | 7/2018 |
| WO | 2018231754 A1 | 12/2018 |
| WO | 2021240060 A1 | 12/2021 |

\* cited by examiner

OPTICAL SYSTEMS WITH INTERLEAVED LIGHT REDIRECTORS

This application claims the benefit of provisional patent application No. 62/735,560, filed Sep. 24, 2018, which is hereby incorporated by reference herein in its entirety.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display unit that generates light and an optical system that redirects the light from the display unit towards an eye box. The optical system may include an input coupler and an output coupler formed on a waveguide. The input coupler may redirect light from the display unit so that it propagates in the waveguide in a first direction towards the output coupler. The output coupler may couple the light out of the waveguide and in a second direction towards the eye box while inverting a parity of the light about the first direction.

The output coupler may include a first light redirecting element that redirects a first portion of the light in a third direction and may include a second light redirecting element that redirects a second portion of the light in a fourth direction opposite the third direction. The first light redirecting element may redirect the second portion of the light redirected by the second light redirecting element towards the eye box in the second direction. The second light redirecting element may redirect the first portion of the light redirected by the first light redirecting element towards the eye box in the second direction. The first and second light redirecting elements may be co-located (e.g., interleaved or overlapping) in the output coupler. The first and second light redirecting elements may include respective sets of diffractive gratings such volume holograms. In another suitable arrangement, the light redirecting elements may include partially reflective mirrors. The output coupler may fill a large eye box with uniform intensity light over a wild field of view while reducing or minimizing the optical path for the light through the output coupler.

DETAILED DESCRIPTION

Figure 1:
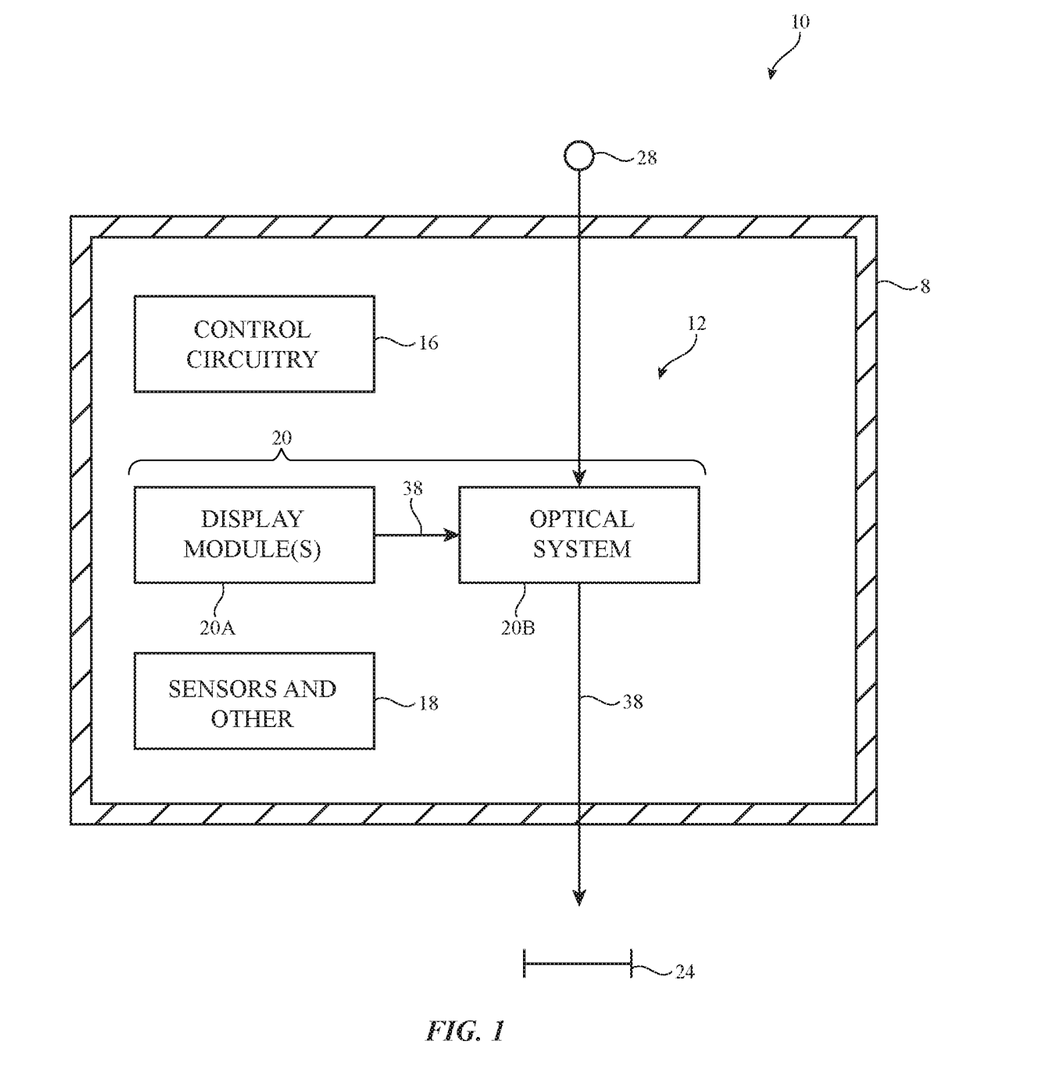
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 20 mounted within support structure (housing) 8. Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by components 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2A:
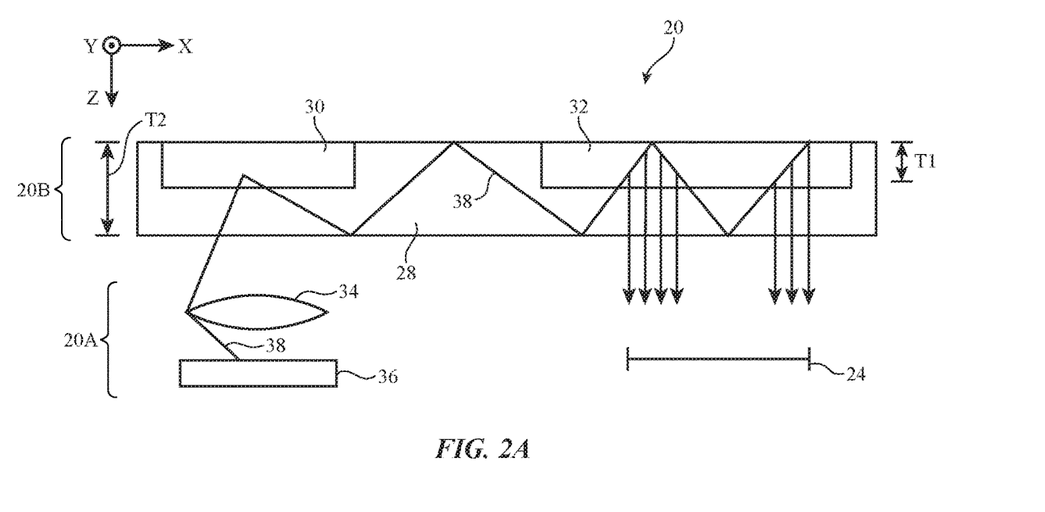
FIG. 2A is a top view of an illustrative display system having an optical system including an input coupler and an output coupler at least partially embedded in a waveguide substrate in accordance with some embodiments.

FIG. 2A is a top view of an illustrative display 20 that may be used in system 10 of FIG. 1. As shown in FIG. 2A, near-eye display 20 may include one or more display modules such as display module 20A and an optical system such as optical system 20B. Optical system 20B may include optical elements such as waveguide 28, input coupler 30, and output coupler 32. Display module 20A may include a display unit 36 and a collimating lens 34. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Display unit 36 may be a display unit based on a liquid crystal display, organic light-emitting diode display, cathode ray tube, plasma display, projector display (e.g., a projector based on an array of micromirrors), liquid crystal on silicon display, or other suitable type of display. Display 36 may generate light 38 associated with image content to be displayed to eye box 24. Light 38 may be collimated using a lens such as collimating lens 34. Optical system 20B may be used to present light 38 output from display unit 36 to eye box 24.

Figure 2B:
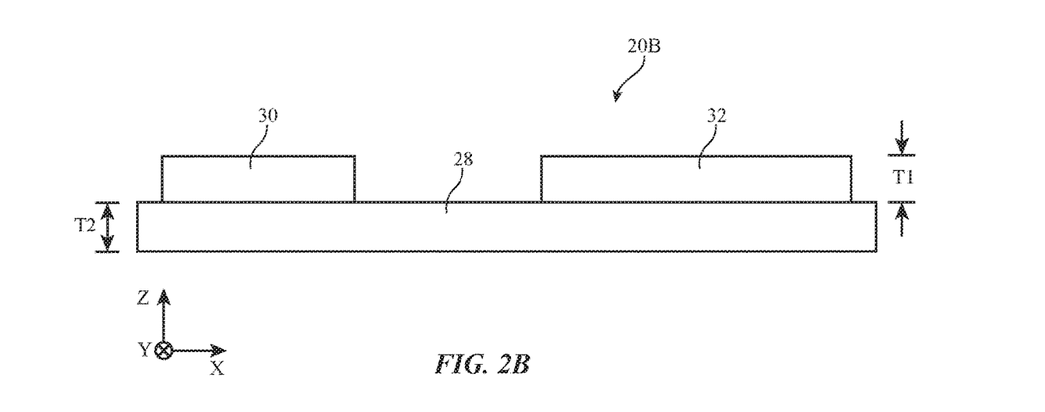
FIG. 2B is a top view of an illustrative display system having an optical system including an input coupler and an output coupler formed on a waveguide substrate in accordance with some embodiments.

Optical system 20B may include one or more couplers such as input coupler 30 and output coupler 32. In the example of FIG. 2A, input coupler 30 and output coupler 32 are at least partially embedded in a waveguide structure such as waveguide 28 (e.g., a polymer, glass, or other transparent substrate capable of guiding light via total internal reflection). In the example of FIG. 2B, input coupler 30 and output coupler 32 are formed on an outer surface of waveguide 28.

Input coupler 30 may be configured to couple light 38 from display unit 36 into waveguide 28, whereas output coupler 32 may be configured to couple light 38 from within waveguide 28 to the exterior of waveguide 28 towards eye box 24. For example, display 36 may emit light 38 in direction −Z towards optical system 20B. When light 38 strikes input coupler 30, input coupler 30 may redirect light 38 so that it propagates within waveguide 28 via total internal reflection towards output coupler 32 (e.g., in direction X). When light 38 strikes output coupler 32, output coupler 32 may redirect light 38 out of waveguide 28 towards eye box 24 (e.g., back along the Z-axis).

Input coupler 30 and output coupler 32 may be based on reflective and refractive optics or may be based on holographic (e.g., diffractive) optics. In arrangements where couplers 30 and 32 are formed from reflective and refractive optics, couplers 30 and 32 may include one or more reflectors (e.g., an array of micromirrors, partial mirrors, or other reflectors). In arrangements where couplers 30 and 32 are based on holographic optics, couplers 30 and 32 may include volume holographic media such as photopolymers, gelatin such as dichromated gelatin, silver halides, holographic polymer dispersed liquid crystal, or other suitable volume holographic media.

A holographic recording may be stored as an optical interference pattern (e.g., alternating regions of different indices of refraction) within the photosensitive optical material. The optical interference pattern may create a holographic grating that, when illuminated with a given light source, diffracts light to create a three-dimensional reconstruction of the holographic recording. The diffractive grating may be a non-switchable diffractive grating that is encoded with a permanent interference pattern or may be a switchable diffractive grating in which the diffracted light can be modulated by controlling an electric field applied to the holographic recording medium.

If desired, couplers 30 and 32 may have thickness T1. Waveguide 28 may have thickness T2. Thicknesses T1 and T2 may be any desired values. If desired, couplers 32 and 30 may be sandwiched between different substrate layers in the waveguide. In another suitable arrangement, couplers 30 and 32 may be formed on the surface of waveguide 28, as shown in FIG. 2B (e.g., as opposed to being embedded in waveguide 28 as shown in FIG. 2A).

Using thick films for couplers 30 and 32 may help increase uniformity in the output image and may provide more material in which to record different optical functions. One optical function recorded in coupler 30, for example, may redirect light having a given input angle to a first output angle (e.g., 45°), whereas another optical function recorded in coupler 30 may redirect light having a given input angle to a second output angle (e.g., 60°). Couplers 30 and 32 may, if desired, be multiplex holograms (e.g., three-color holograms such as red-green-blue holograms) for forming color images. The diffraction efficiency in each coupler 30 and 32 may be modulated (e.g., may vary across the width of couplers 30 and 32) so that light exits each coupler in a smooth, uniform manner.

In practice, it may be desirable for output coupler 32 to fill as large of an eye box 24 with uniform intensity light 38 as possible. If desired, light redirecting elements in output coupler 32 may be configured to expand light 38 in one or more dimensions while also coupling light 38 out of waveguide 28. The light redirecting elements may be formed from mirrors (e.g., partially reflective mirrors) or diffractive gratings (e.g., volume holograms) as two examples.

In some scenarios, different light redirecting elements are arranged in a sequential manner in the output coupler for redirecting the light in different directions. However, arranging light redirecting elements in a sequential manner may consume an excessive amount of space within system 10, where space is often at a premium. Space within system 10 may be more efficiently utilized by co-locating multiple light redirecting elements for redirecting (expanding) light 38 in different directions (e.g., in an overlapping or interleaved arrangement in or on waveguide 28). In scenarios where the light redirecting elements are formed using partial mirrors oriented at different angles, the mirrors may be co-located by interleaving different mirrors at different orientations throughout coupler 32. In scenarios where the light redirecting elements are formed using diffractive gratings such as volume holograms, the diffractive gratings may be written to the same volume holographic medium (e.g., each volume hologram may be formed from different interference patterns of refractive index modulations that are superimposed on the same volume of medium). Despite being located in the same volume, the gratings in each light redirecting element may diffract incoming light in different respective directions.

Figure 3:
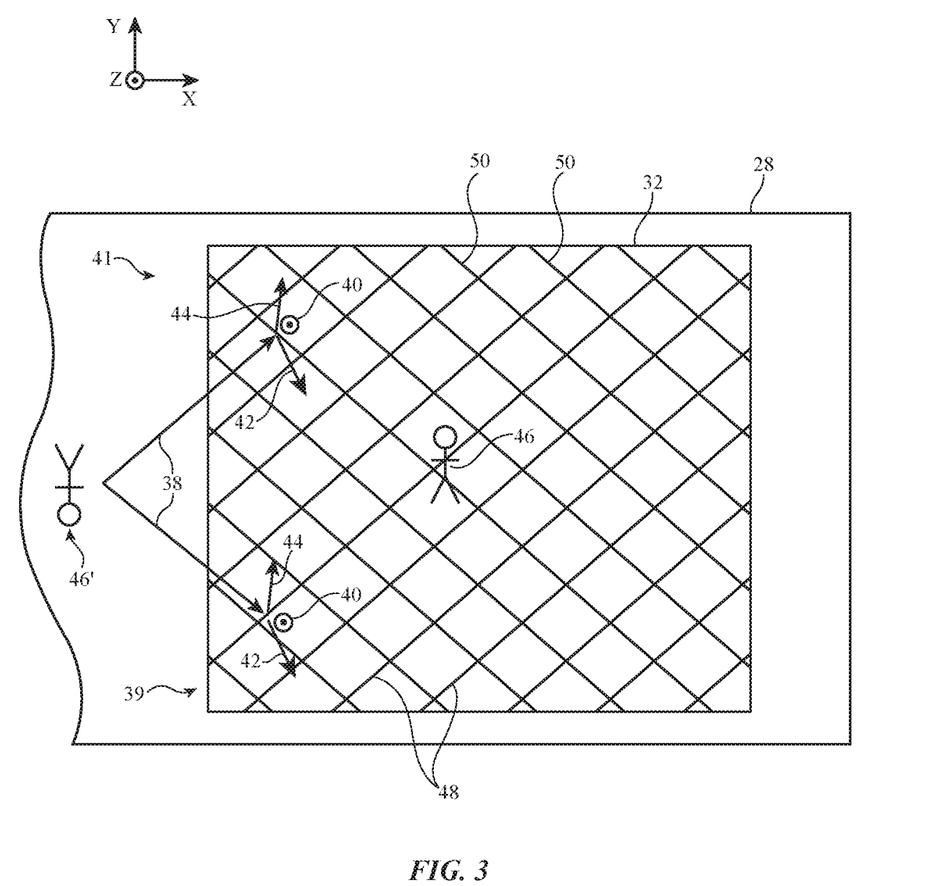
FIG. 3 is a front view of an illustrative output coupler having interleaved (co-located) light redirecting elements that invert vertical-axis parity of an incoming image in accordance with some embodiments.

FIG. 3 is a front view of output coupler 32 having first and second light redirecting elements for redirecting image light 38 in different directions and to thereby expand the image light output from the waveguide to eye box 24 in two dimensions. As shown in FIG. 3, output coupler 32 in or on waveguide 28 may include a first light redirecting element 50 that is co-located (interleaved) with a second light redirecting element 48. In one suitable arrangement, first light redirecting element 50 may include a set of mirrors (e.g., partially reflective mirrors) arranged in a first orientation whereas second light redirecting element 50 includes a set of mirrors arranged in a second orientation. In another suitable arrangement, first light redirecting element 50 may include a first set of one or more diffraction gratings (volume holograms) arranged in a first orientation (e.g., where the alternating indices of refraction associated with element 50 are arranged parallel to a first direction) whereas second light redirecting element 48 may include a second set of one or more diffraction gratings (volume holograms) arranged in a second orientation (e.g., where the alternating indices of refraction associated with element 48 are arranged parallel to a second direction that is different from the first direction). Each set of diffraction gratings may extend across the entire volume of coupler 32, for example.

Light 38 may be conveyed to coupler 32 through waveguide 28. First light redirecting element 50 may be configured to reflect light 38 about a first reflective axis whereas second light redirecting element 48 is configured to reflect light 38 about a second reflective axis that is different from the first reflective axis. Each light redirecting element may be configured to perform dual functions on light 38. For example, each light redirecting element may be configured to redirect light 38 both in a vertical direction (parallel to the Y-axis) and may be configured to redirect light 38 out of coupler 32 (e.g., parallel to the Z-axis).

As shown in the example of FIG. 3, first light redirecting element 50 may redirect light 38 traveling in the +Y and +X directions downwards (e.g., in the −Y direction) and outwards (e.g., in the +Z direction), as shown by arrows 42 and 40. At the same time, second light redirecting element 48 may redirect light 38 traveling in the −Y and +X directions upwards (e.g., in the +Y direction) and outwards (e.g., in the +Z direction), as shown by arrows 44 and 40. In other words, light that has been +Y expanded by redirecting element 48 may be output coupled by the other light redirecting element 50 and the light that has been −Y expanded by redirecting element 50 may be output coupled by the other light redirecting element 48. In this way, each light redirecting element may perform two different redirection operations (e.g., four total redirection operations such as +Y expansion, output coupling of +Y expanded light, −Y expansion, and output coupling of −Y expanded light) so that only two redirecting elements need be formed in coupler 32 (rather than requiring four separate light redirecting components to respectively perform +Y expansion, output coupling of +Y expanded light, −Y expansion, and output coupling of −Y expanded light). This may serve to reduce the manufacturing cost and complexity of system 10, to reduce optical travel distance, to increase throughput, and to optimize space use without sacrificing field of view. In addition, this may serve to reduce the number of interactions with the light redirecting elements necessary for each of the light rays to reach the eye, thereby increasing efficiency of the output coupler.

Light redirecting elements 48 and 52 may vertically invert images in light 38 about the X-axis (e.g., the Y-axis parity of the images in light 38 may be reversed by coupler 32). In order to counteract the parity inversion of coupler 32, images in incoming light 38 may be vertically inverted (e.g., about the X-axis) prior to being provided to coupler 32. As shown in the example of FIG. 3, incoming light 22 may be provided with a vertically inverted image 46' prior to being conveyed to coupler 32 (e.g., inverted image 46' may be emitted by display 36 of FIG. 2A as an inverted image or display 36 may emit an un-inverted image that is inverted by optical components such as lenses and/or mirrors between display 36 and output coupler 32). As shown in FIG. 3, light redirecting components 50 and 48 serve to vertically invert inverted image 46' to recover un-inverted image 46 that is coupled out of the waveguide and provided to eye box 24 (FIG. 1).

Figure 4:
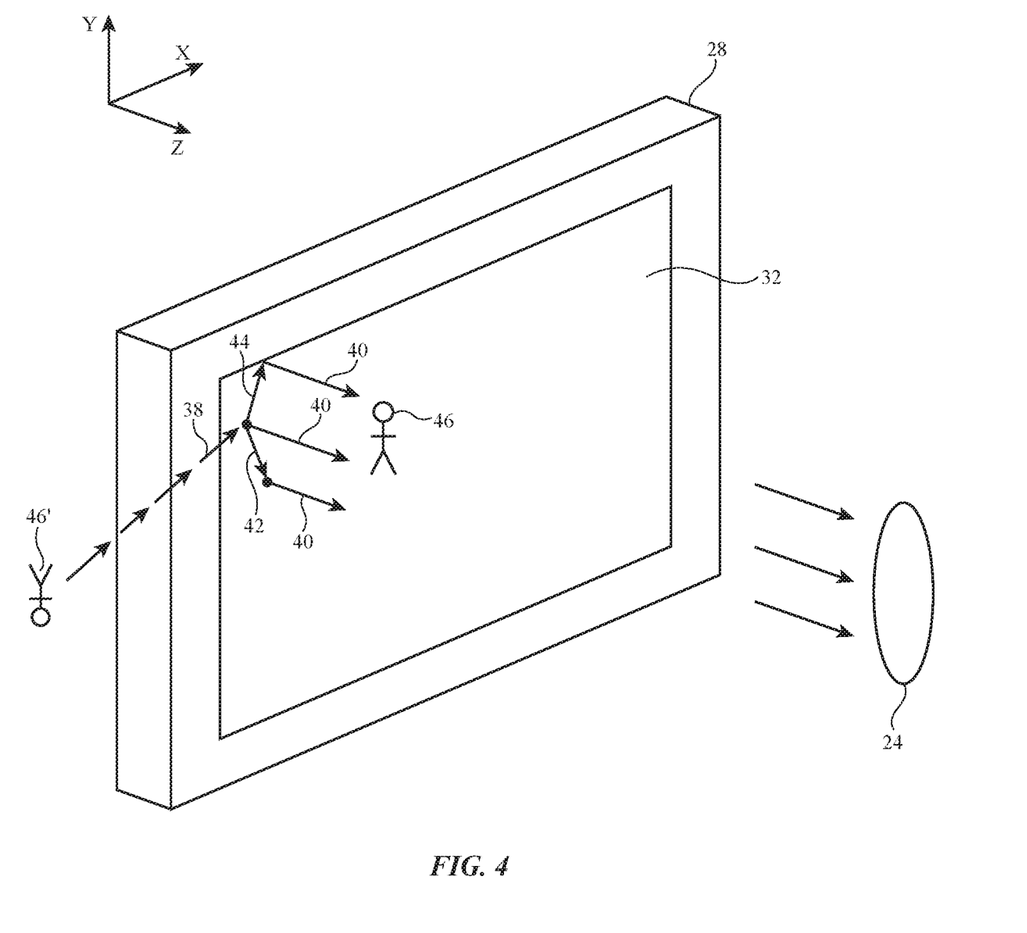
FIG. 4 is a perspective view of an illustrative output coupler having interleaved light redirecting elements in accordance with some embodiments.

FIG. 4 is a perspective view of output coupler 32. As shown in FIG. 4, light 38 provided to output coupler 32 may include inverted image 46'. Output coupler 32 may redirect light 38 in the +Y direction (as shown by arrow 44) and the +Z direction (as shown by arrow 40) using light redirecting element 48. At the same time, output coupler 32 may redirect light 38 in the −Y direction (as shown by arrow 42) and the +Z direction (as shown by arrow 40) using light redirecting element 50. This may serve to vertically invert the inverted image 46' to recover un-inverted image 46 that is provided to eye box 24. By performing light expansion operations in this way using coupler 32, a relatively large eye box 24 may be filled with uniform intensity image light for a wide field of view.

Figure 5:
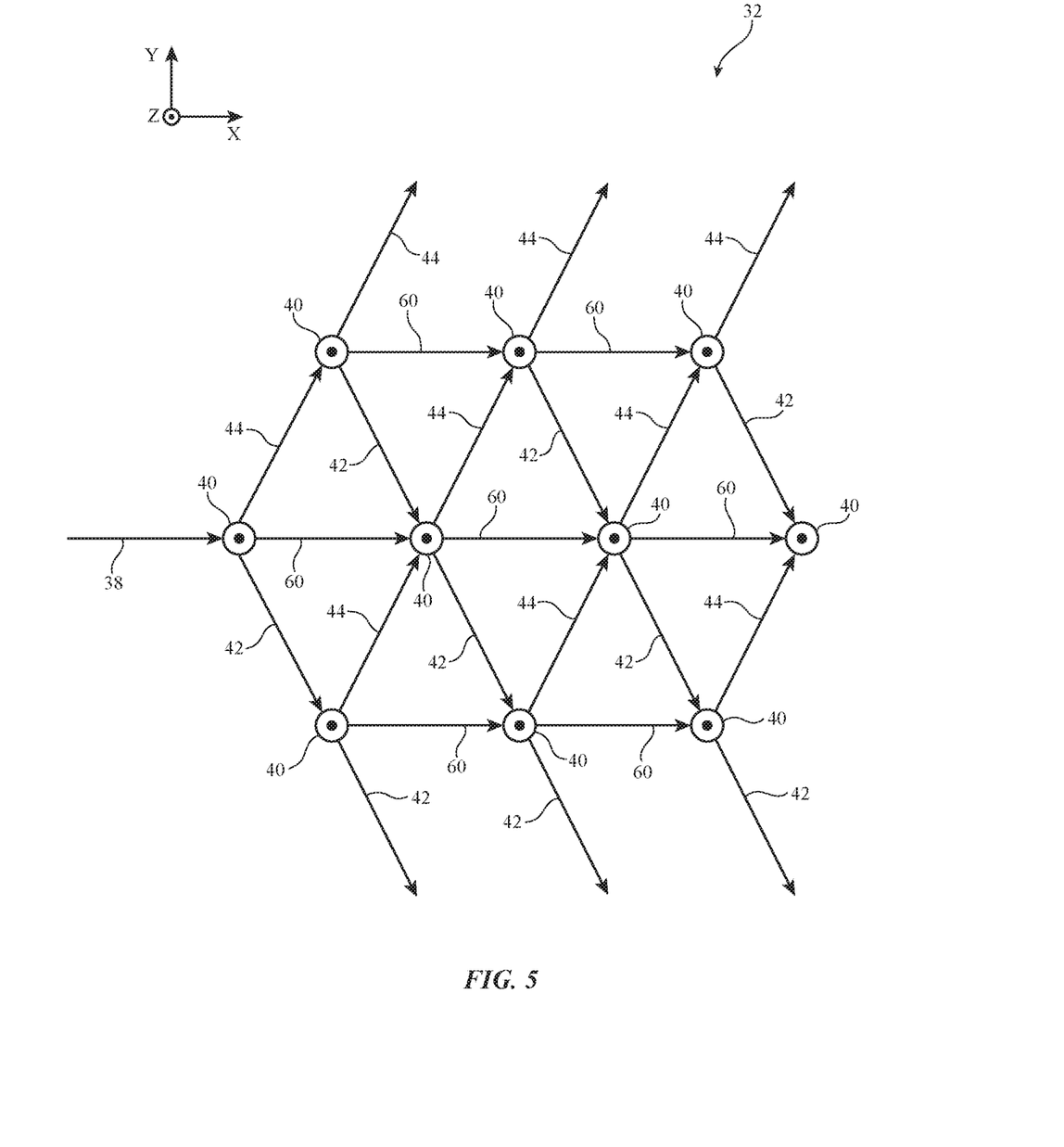
FIG. 5 is a ray diagram showing how illustrative interleaved first and second light redirecting elements in an output coupler may redirect light in different directions in accordance with some embodiments.

The examples of FIGS. 3 and 4 only show one or two light redirection operations performed by coupler 32 for the sake of clarity. In practice, these light redirections are performed throughout coupler 32 as light 38 propagates down the length of coupler 32. Light 38 may be continuously expanded in the +Y and −Y directions while propagating in the +X direction and being output coupled in the +Z direction. FIG. 5 is a ray diagram showing how light 38 may be redirected by the redirecting elements 50 and 48 in coupler 32 during propagation.

As shown in FIG. 5, incoming light 38 may be redirected in the +Y direction and in the +Z direction by redirecting elements 48 (as shown by arrows 44 and 40) and may be redirected in the −Y direction and in the +Z direction by redirecting elements 50 (as shown by arrows 42 and 40). Light redirecting elements 48 and 50 may only be partially reflective (or transmissive) and may not redirect all of the incoming light at any given point. In other words, some of light 38 continues to propagate down the length of coupler 32, as shown by arrows 60. This light is further reflected (as shown by arrows 40, 44, and 42) as it propagates down coupler 32. Arrows (rays) 44 and 40 of FIG. 5 may, for example, be produced by light redirecting element 48 of FIG. 3 whereas arrows 42 and 40 are produced by light redirecting element 50.

Figure 6:
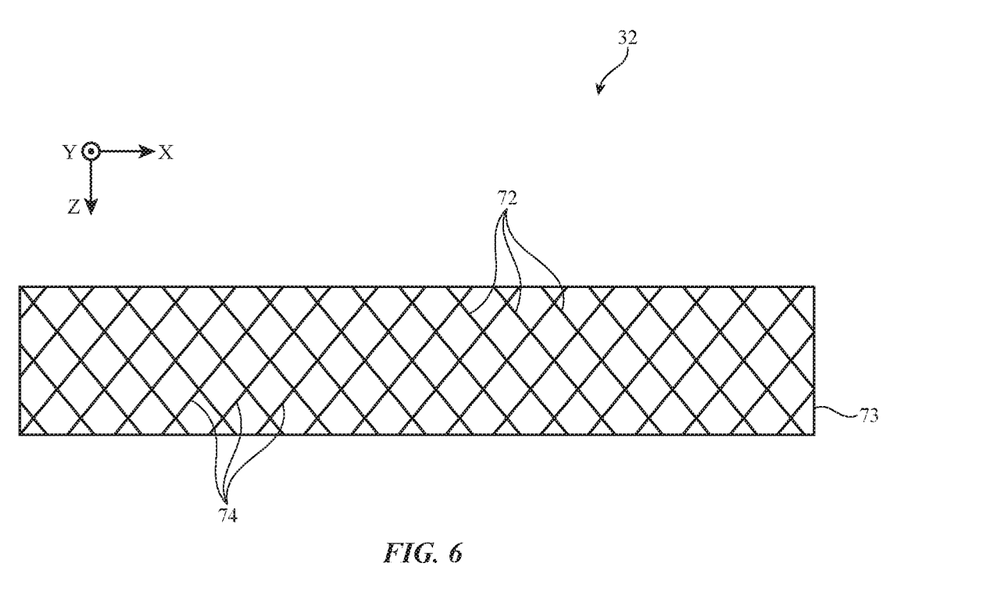
FIG. 6 is a top view showing how illustrative interleaved first and second light redirecting elements may be formed from different sets of diffractive gratings in accordance with some embodiments.

Light redirecting elements 48 and 50 may be formed using partially reflective mirrors, diffractive gratings (e.g., volume holograms, surface holograms, etc.), or other components. FIG. 6 is a top view of coupler 32 showing an example of how light redirecting elements 48 and 50 may be formed from diffractive gratings. As shown in FIG. 6, coupler 32 may include a first set of diffractive gratings 72 used to form first light redirecting element 50 and a second set of diffractive gratings 74 used to form second light redirecting element 48. The first set of gratings 72 and the second set of gratings 74 may both be written to the same volume holographic medium 73 (sometimes referred to as grating medium 73 or writing medium 73). The first set of gratings 72 may, for example, be written to medium 73 before or after writing the second set of gratings 74 to medium 73. In another suitable arrangement, the first and seconds sets of gratings may be written to different media and/or may be formed on different substrates (e.g., the sets of gratings may be overlapping either within the same volume of medium or within or on different overlapping media).

The first set of gratings 72 may be formed from variations in index of refraction that are provided with the same orientation in medium 73. The variations in index of refraction may be modulated to form one or more different diffractive gratings (holograms) within set 72. Different modulations/grating pitches may be used to form the different respective gratings (holograms) within set 72. The different respective gratings may allow light redirecting element 50 to operate on a range of input angles and/or colors by redirecting light from the range of input angles and/or colors in the same output direction.

Similarly, the second set of gratings 74 may be formed from variations in index of refraction that are provided with the same orientation in medium 73 (e.g., an orientation that is different from the orientation of the first set of gratings 72). The variations in index of refraction may be modulated to form one or more different diffractive gratings (holograms) within set 74. Different modulations/grating pitches may be used to form the different respective gratings (holograms) within set 74. The different respective gratings may allow light redirecting element 48 to operate on a range of input angles and/or colors by redirecting light from the range of input angles and/or colors in the same output direction.

In momentum space (e.g., three dimensional k-space), the first set of gratings 72 of first light redirecting element 50 may exhibit a first grating vector from a first k-space region to a second k-space region and may exhibit a second grating vector from a third k-space region to a fourth k-space region. The second set of gratings 74 of second light redirecting element 48 may exhibit a third grating vector from the first region to the third region and may exhibit a fourth grating vector from the second region to the fourth region. The third and fourth grating vectors may extend parallel to each other in k-space, for example. Similarly, the first and second grating vectors may extend parallel to each other in k-space.

The first grating vector may be associated with diffraction of incoming light in the −Y direction of FIG. 3 by the first set of gratings 72 (light redirecting element 50). The third grating vector may be associated with diffraction of incoming light in the +Y direction of FIG. 3 by the second set of gratings 74 (light redirection element 48). The second grating vector may be associated with the diffraction of the light diffracted in the +Y direction by second set of gratings 74 in the +Z direction (towards eye box 24) by the first set of gratings 72 (light redirection element 50). Similarly, the fourth grating vector may be associated with the diffraction of the light diffracted in the −Y direction by first set of gratings 72 in the +Z direction (towards eye box 24) by the second set of gratings 74.

In other words, the second set of diffraction gratings 74 may out couple the light that is diffracted in the −Y direction by the first set of gratings 72 and the first set of diffraction gratings 72 may out couple the light that is diffracted in the +Y direction by the second set of gratings 74. In this way, all of the incoming light may be out coupled towards eye box 24, regardless of whether the light was diffracted in the +Y or −Y directions (e.g., regardless of the k-space path followed so that a single coherent image 46 is produced at eye box 24 rather than double images).

The first set of gratings 72 and the second set of gratings 74 each include multiple different diffractive gratings (holograms) having grating vectors extending between different points within the first, second, third, and fourth k-space regions. In this way, each set of gratings may actually include different individual gratings for operating on input light over a range of angles. For example, the second set of gratings 74 may include an individual grating having a grating vector extending between any pair of points in the first and third k-space regions and a grating vector extending between any pair of points in the second and fourth k-space regions. Similarly, the first set of gratings 72 may include individual gratings having grating vectors extending from any desired points in the first k-space region to corresponding points in the second k-space region and extending from any desired points in the third k-space region to corresponding points in the fourth k-space regions. The k-space regions may be three-dimensional volumes if desired so that each set of gratings operates on a range of colors in addition to a range of input angles, for example.

Figure 7A:
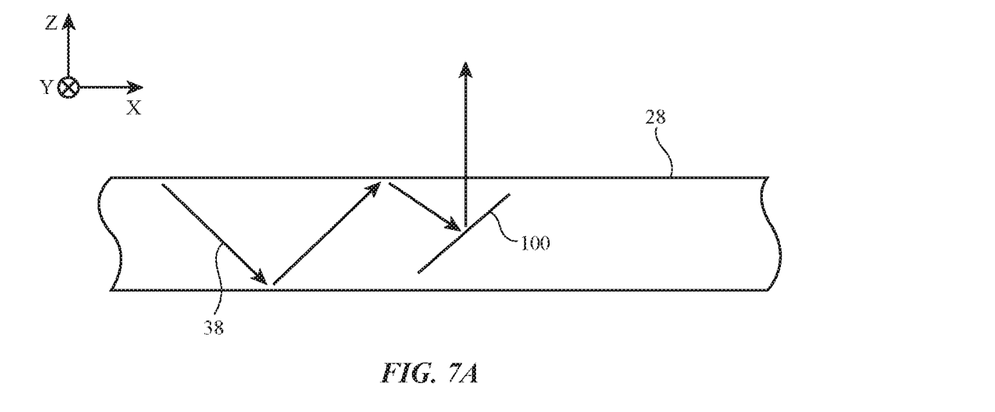
FIGS. 7A and 7B are bottom views showing how illustrative light redirecting elements may be formed using reflection-type or transmission-type diffractive gratings in accordance with some embodiments.
Figure 7B:
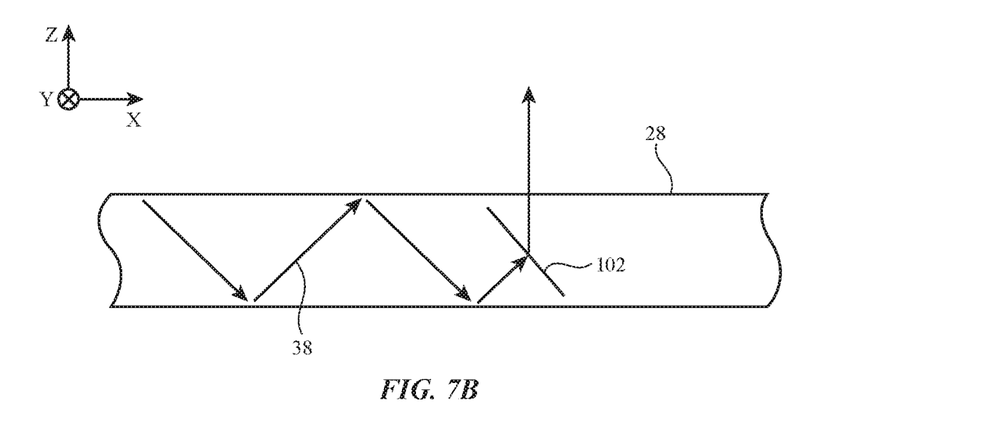

The diffractive gratings in first set 72 and second set 74 may be reflection-type (mirror-type) diffraction gratings or transmission-type diffraction gratings. FIG. 7A is a bottom view of a reflection-type grating 100 that may be used to form the gratings in sets 72 and 74. As shown in FIG. 7A, reflective grating 100 operates by diffracting light 38 with the opposite z-direction of the incident light 38. FIG. 8B is a bottom view of a transmission grating-type diffraction grating 102 that may be used to form the gratings in sets 72 and 74. As shown in FIG. 7B, transmission grating 102 operates by diffracting light 38 with the same z-direction of the incident light 38. Either of the reflection-type gratings 100 of FIG. 7A or the transmission-type gratings 102 of FIG. 7B may be used to implement the diffractive gratings in light redirecting elements 48 and 50.

Figure 8:
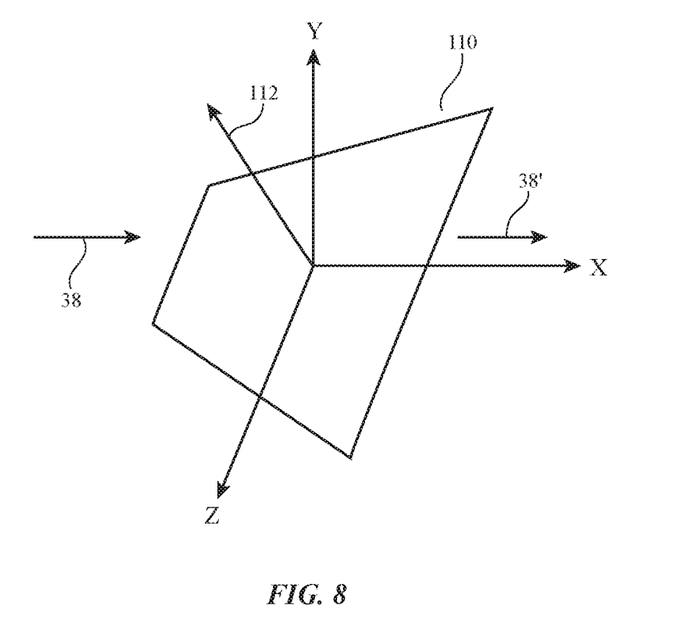
FIG. 8 is a perspective view of an illustrative light redirecting element formed from a partially-reflective mirror in accordance with some embodiments.

In another suitable arrangement, light redirecting elements 48 and 50 may be formed using partial mirrors. FIG. 8 is a perspective view of an illustrative partial mirror 110 that may be used to form light redirecting elements 48 and 50. As shown in FIG. 8, partial mirror 110 may reflect a first portion of incoming light 38 and may transmit a second portion 38' of the incoming light. Mirror 110 may have a normal axis 112 that is oriented at non-zero angles with respect to each of the X, Y, and Z axes. This may allow mirror 110 to reflect light 38 in both the +Y and +Z directions (e.g., when used to implement light redirecting element 48 of FIG. 3) or to reflect light 38 in both the -Y and +Z directions (e.g., when used to implement light redirecting element 50 of FIG. 3). Mirrors such as mirrors 110 that are oriented in different directions (e.g., for elements 48 and 50) may be distributed in an interleaved pattern throughout output coupler 32. These examples are merely illustrative and, in general, any desired diffractive and/or reflective structures may be used to form light redirection elements 48 and 50.

When configured using the structures of FIGS. 1-8, display 20 may exhibit a relatively wide field of view and may fill a relatively wide eye box 24 with light of uniform intensity. Co-locating light redirection elements 48 and 50 may reduce the optical travel distance for light 38 to reduce haze and scattering in the system while occupying a reduced or minimal amount of space within system 10.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality' of virtual objects with which a person may sense and interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements. The foregoing is merely illustrative and various modifications can be made to the described embodiments. The foregoing embodiments may be implemented individually or in any combination.

What is claimed is:

1. An electronic device comprising:
a projector; and
an optical system configured to receive light from the projector and configured to redirect the light in a first direction, wherein the optical system includes an input coupler, an output coupler, and a waveguide that propagates the light along a second direction, the output coupler comprising:
a grating medium having a first surface and a second surface opposite the first surface,
a first light-redirecting element configured to redirect the light in a third direction and in the first direction, the first light-redirecting element extending from the first surface to the second surface of the grating medium and comprising a first set of diffractive gratings having a first set of grating vectors extending from a first k-space region to a second k-space region and having second set of grating vectors extending parallel to the first set of grating vectors and from a third k-space region to a fourth k-space region, and
a second light-redirecting element that overlaps the first light-redirecting element and that is configured to redirect the light in a fourth direction opposite the third direction and in the first direction, wherein the waveguide has a first exterior surface and a second exterior surface opposite the first exterior surface, the first and second light-redirecting elements are superimposed in a same volume of the grating medium that is located within an interior of the waveguide between the first exterior surface and the second exterior surface, the output coupler is configured to couple the light out of the waveguide through the first surface of the grating medium, the second light-redirecting element extends from the first surface to the second surface of the grating medium, and the second set of light-redirecting elements comprises a second set of diffractive gratings having a third set of grating vectors extending from the first k-space region to the third k-space region and having a fourth set of grating vectors extending parallel to the third set of grating vectors and from the second k-space region to the fourth k-space region.

2. The electronic device of claim 1, wherein the first light-redirecting element is configured to redirect, in the first direction, the light that was redirected by the second light-redirecting element in the fourth direction.

3. The electronic device of claim 2, wherein the second light-redirecting element is configured to redirect, in the first direction, the light that was redirected by the first light-redirecting element in the third direction.

4. The electronic device of claim 3, wherein the first light-redirecting element comprises a first set of partially-reflective mirrors at a first orientation and wherein the second light-redirecting element comprises a second set of partially-reflective mirrors at a second orientation that are interleaved among the first set of partially-reflective mirrors.

5. The electronic device of claim 3, wherein the first light-redirecting element comprises a first set of volume holograms.

6. The electronic device of claim 5, wherein the second light-redirecting element comprises a second set of volume holograms.

7. The electronic device of claim 6, wherein each of the volume holograms in the first set comprises index of refraction variations oriented in a first direction and wherein each of the volume holograms in the second set comprises index of refraction variations oriented in a second direction that is different from the first direction.

8. The electronic device of claim 6, wherein the first and second sets of volume holograms comprise reflection holograms.

9. The electronic device of claim 6, wherein the first and second sets of volume holograms comprise transmission holograms.

10. The electronic device of claim 1, wherein the first and second light-redirecting elements are configured to invert a parity of an image in the light about the second direction.

11. The electronic device of claim 10, wherein the projector is configured to emit an inverted version of the image in the light received by the optical system.

12. The electronic device of claim 1, wherein the first light-redirecting element comprises a first volume hologram having a first line of constant refractive index and a second line of constant refractive index parallel to the first line of constant refractive index, the second light-redirecting element comprises a second volume hologram having a third line of constant refractive index, and the third line of constant refractive index of the second volume hologram contacts and intersects both the first line of constant refractive index and the second line of constant refractive index of the first volume hologram.

13. An electronic device comprising:
a display unit; and
an optical system that receives light from the display unit and that redirects the light for view, wherein the optical system includes a waveguide that propagates the light along a first axis and an output coupler that redirects the light out of the waveguide, the output coupler receives the light with a first parity about the first axis, the output coupler is configured to redirect the light out of the waveguide with a second parity about the first axis that is opposite to the first parity, the output coupler comprises a first set of diffraction gratings and a second set of diffraction gratings that are in direct contact with each other and superimposed in a same volume of a grating medium, the grating medium has a first surface and a second surface opposite the first surface, the diffraction gratings in the first and second sets extend from the first surface to the second surface, the first and second diffraction gratings diffract the light out of the waveguide through the first surface, the first set of diffraction gratings have a first set of grating vectors extending from a first k-space region to a second k-space region and have a second set of grating vectors extending parallel to the first set of grating vectors and from a third k-space region to a fourth k-space region, and the second set of diffraction gratings have a third set of grating vectors extending from the first k-space region to the third k-space region and have a fourth set of grating vectors extending parallel to the third set of grating vectors and from the second k-space region to the fourth k-space region.

14. The electronic device of claim 13, wherein the display unit is configured to emit the light with an image that is inverted about the first axis.

15. The electronic device of claim 13, wherein the first set of diffraction gratings is configured to diffract the light in a first direction along a second axis, the second set of diffraction gratings is configured to diffract the light diffracted in the first direction by the first set of diffraction gratings in a second direction along a third axis, the second set of diffraction gratings is configured to diffract the light in a third direction along the second axis that is opposite to the first direction, and the first set of diffraction gratings is configured to diffract the light diffracted by the second set of diffraction gratings in the third direction in the second direction along the third axis.

16. An electronic device comprising:
a projector that emits light;
a waveguide configured to propagate the light in a first direction; and
an optical coupler that couples the light out of the waveguide in a second direction, the optical coupler comprising:
a first set of diffraction gratings configured to diffract a first portion of the light in a third direction, and
a second set of diffraction gratings overlapping the first set of diffraction gratings and configured to diffract a second portion of the light in a fourth direction opposite the third direction, wherein:
the first set of diffraction gratings is configured to diffract the second portion of the light diffracted by the second set of diffraction gratings in the second direction,
the second set of diffraction gratings is configured to diffract the first portion of the light diffracted by the first set of diffraction gratings in the second direction,
the first set of diffraction gratings have a first set of grating vectors extending from a first k-space region to a second k-space region and a second set of grating vectors extending parallel to the first set of grating vectors and from a third k-space region to a fourth k-space region, and
the second set of diffraction gratings have a third set of grating vectors extending from the first k-space region to the third k-space region and a fourth set of grating vectors extending parallel to the third set of grating vectors and from the second k-space region to the fourth k-space region.

17. The electronic device of claim 16, wherein the first set of diffraction gratings and the second set of diffraction gratings are superimposed in a same volume of a grating medium.

* * * * *

UNITED STATES PATENT AND TRADEMARK OFFICE
CERTIFICATE OF CORRECTION

| | | |
|---|---|---|
| PATENT NO. | : 12,147,038 B2 | Page 1 of 1 |
| APPLICATION NO. | : 16/539818 | |
| DATED | : November 19, 2024 | |
| INVENTOR(S) | : Se Baek Oh et al. | |

It is certified that error appears in the above-identified patent and that said Letters Patent is hereby corrected as shown below:

On the Title Page

Right Column, Item (57), Line 1, "a display that produce" should read -- a display that produces --

In the Claims

Column 12, Line 21, "having second set" should read -- having a second set --

Signed and Sealed this
Twenty-first Day of January, 2025

Coke Morgan Stewart
*Acting Director of the United States Patent and Trademark Office*